(12) United States Patent
Kurumasa et al.

(10) Patent No.: US 10,063,730 B2
(45) Date of Patent: Aug. 28, 2018

(54) IMAGE FORMING SYSTEM, IMAGE FORMING APPARATUS, REMOTE CONTROL APPARATUS, AND RECORDING MEDIUM

(71) Applicant: KONICA MINOLTA, INC., Chiyoda-ku (JP)

(72) Inventors: Yoichi Kurumasa, Toyokawa (JP); Yoshiyuki Tamai, Toyohashi (JP); Mitsutaka Morita, Hachioji (JP); Mie Kawabata, Toyokawa (JP); Ryosuke Nishimura, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 14/296,516

(22) Filed: Jun. 5, 2014

(65) Prior Publication Data
US 2014/0368871 A1  Dec. 18, 2014

(30) Foreign Application Priority Data

Jun. 17, 2013  (JP) .................................. 2013-126516

(51) Int. Cl.
*H04N 1/00* (2006.01)
(52) U.S. Cl.
CPC ..... *H04N 1/00973* (2013.01); *H04N 1/00127* (2013.01); *H04N 1/00392* (2013.01);
(Continued)
(58) Field of Classification Search
CPC ........... H04N 1/00973; H04N 1/00411; H04N 1/00127; H04N 1/00392; H04N 2201/0075; H04N 2201/0094
(Continued)

(56) References Cited

U.S. PATENT DOCUMENTS 6,661,920 B1 * 12/2003 Skinner ............... G06F 3/04883
                                                345/169
2006/0103666 A1 * 5/2006 Kita ...................... G06K 15/00
                                                345/619
(Continued)

FOREIGN PATENT DOCUMENTS

JP    H05-122424 A    5/1993
JP    2001014103 A    1/2001
(Continued)

OTHER PUBLICATIONS

Japanese Office Action with English translation,corresponding to Japanese Patent Application No. 2013-126516, dated May 19, 2015; 7 pages.

*Primary Examiner* — Neil R McLean
*Assistant Examiner* — Darryl V Dottin
(74) *Attorney, Agent, or Firm* — Buchanan Ingersoll & Rooney PC

(57) ABSTRACT

A remote control apparatus for remotely controlling an image forming apparatus includes a display unit configured to display an operation screen for remotely controlling the image forming apparatus, an activation unit configured to activate a handwriting input application that is installed in the remote control apparatus in a state where image data for displaying a keyboard screen as the operation screen is received from the image forming apparatus, and a display control unit configured to display a handwriting input screen on the display unit, the handwriting input screen being an input screen for the handwriting input application activated by the activation unit.

21 Claims, 12 Drawing Sheets

(52) U.S. Cl.
CPC . *H04N 1/00411* (2013.01); *H04N 2201/0075* (2013.01); *H04N 2201/0094* (2013.01)

(58) Field of Classification Search
USPC ........................................................ 358/1.15
See application file for complete search history.

(56) References Cited

U.S. PATENT DOCUMENTS

| | | | | |
|---|---|---|---|---|
| 2008/0051032 | A1* | 2/2008 | Hashimoto | H04M 1/737 455/41.3 |
| 2009/0146860 | A1* | 6/2009 | Kwon | G08C 17/02 341/176 |
| 2011/0131487 | A1* | 6/2011 | Nakajima | G06F 17/241 715/259 |
| 2013/0263002 | A1* | 10/2013 | Park | G06F 3/0484 715/719 |
| 2013/0308159 | A1* | 11/2013 | Yoshimura | H04N 1/00973 358/1.15 |
| 2014/0111439 | A1 | 4/2014 | Joe et al. | |

FOREIGN PATENT DOCUMENTS

| | | |
|---|---|---|
| JP | 2003-067673 A | 3/2003 |
| JP | 2003-224696 A | 8/2003 |
| JP | 2003316490 A | 11/2003 |
| JP | 2005031786 A | 2/2005 |
| JP | 2005045308 A | 2/2005 |
| JP | 2008-233483 A | 10/2008 |
| JP | 2008269525 A | 11/2008 |
| WO | 2013024530 A1 | 2/2013 |

* cited by examiner

Fig.4

IMAGE FORMING SYSTEM, IMAGE FORMING APPARATUS, REMOTE CONTROL APPARATUS, AND RECORDING MEDIUM

This application is based on Japanese Patent Application No. 2013-126516 filed on Jun. 17, 2013, the contents of which are hereby incorporated by reference.

BACKGROUND OF THE INVENTION

Technical Field

The present invention relates to an image forming system including an image forming apparatus such as a Multi-Functional Peripheral (MFP) and a technique related thereto.

Background Art

A technique for operating an image forming apparatus using an external terminal (remote control apparatus) is known.

For instance, Japanese Patent Application Laid-Open No. 05-122424 discloses a technique for directly transmitting operation screen data itself (e.g., bitmapped image data) from an image forming apparatus to an external terminal to display an operation screen on a display unit of the external terminal and transmitting and receiving operational position information regarding an operational position in the operation screen (e.g., information regarding a pressed position) to receive operation input through the operation screen. This is a so-called remote control technique using remote connection.

Incidentally, with the above remote control technique, a keyboard screen having a software keyboard may be used to input characters. Specifically, keyboard screen data itself (e.g., bitmapped image data) is transmitted from an image forming apparatus to an external terminal, and the keyboard screen is displayed on a display unit of the external terminal. Then, operational position information regarding an operational position in the keyboard screen (e.g., information regarding a pressed position) is transmitted from the external terminal to the image forming apparatus, and thereby characters input through the operation screen are received.

However, there are users who are not familiar with keyboard screen operations, and thus operability offered by the above technique is not necessarily sufficient.

SUMMARY OF THE INVENTION

One of objects of the present invention is to provide a technique that enables a character input method that is different from a character input method using a keyboard screen to be easily used in a remote control apparatus.

A first aspect of the present invention is a remote control apparatus for remotely controlling an image forming apparatus. The remote control apparatus includes a display unit configured to display an operation screen for remotely controlling the image forming apparatus, an activation unit configured to activate a handwriting input application that is installed in the remote control apparatus, in a state where image data for displaying a keyboard screen as the operation screen is received from the image forming apparatus, and a display control unit configured to display a handwriting input screen on the display unit, the handwriting input screen being an input screen for the handwriting input application activated by the activation unit.

A second aspect of the present invention is a non-transitory computer-readable recording medium having recorded thereon a program for causing a computer built into a remote control apparatus for remotely controlling an image forming apparatus to execute the steps of a) receiving image data for displaying a keyboard screen on the remote control apparatus from the image forming apparatus, b) activating a handwriting input application that is installed in the remote control apparatus in a state where the image data of the keyboard screen is received from the image forming apparatus, and c) displaying a handwriting input screen on a display unit provided in the remote control apparatus, the handwriting input screen being an input screen for the handwriting input application activated in the step b).

A third aspect of the present invention is an image forming system including an image forming apparatus and a remote control apparatus for remotely controlling the image forming apparatus. The image forming apparatus includes a receiving unit configured to receive position information from the remote control apparatus, the position information being information regarding input of operation from an operator to an operation screen displayed on the remote control apparatus, and a transmission unit configured to transmit image data of a keyboard screen to the remote control apparatus when it is determined, on the basis of the position information, that the input of operation is a command to display a software keyboard. The remote control apparatus includes a display unit configured to display an operation screen for remotely controlling the image forming apparatus, and a display control unit configured to display a handwriting input screen on the display unit, the handwriting input screen being an input screen for the handwriting input application activated by the activation unit.

A fourth aspect of the present invention is an image forming apparatus capable of being remotely controlled by a remote control apparatus. The image forming apparatus includes a receiving unit configured to receive position information from the remote control apparatus, the position information being information regarding input of operation from an operator to an operation screen displayed on the remote control apparatus, and a transmission unit configured to transmit image data of a keyboard screen and activation command data to the remote control apparatus when it is determined, on the basis of the position information, that the input of operation is a command to display a software keyboard, the activation command data indicating that a handwriting input application installed in the remote control apparatus is to be activated.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 illustrates an email transmission screen.

DETAILED DESCRIPTION OF THE PREFERRED EMBODIMENTS

Hereinafter, embodiments of the present invention will be described with reference to the accompanying drawings.

1. First Embodiment

1-1. Overall Configuration

Figure 1:
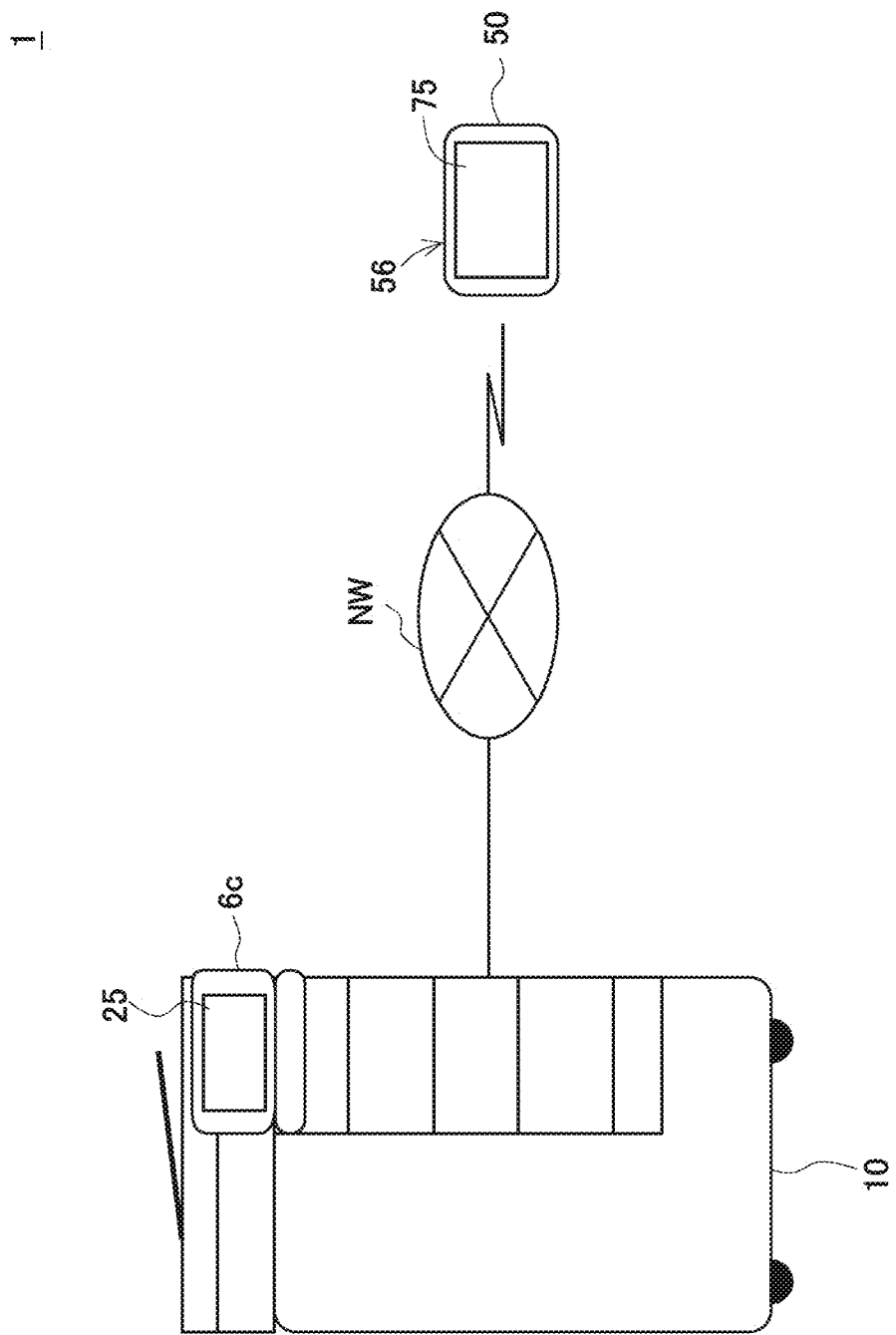
FIG. 1 illustrates an image forming system.

FIG. 1 illustrates an image forming system 1. As illustrated in FIG. 1, the image forming system 1 includes an image forming apparatus 10 and an external terminal 50.

The image forming apparatus 10 and the external terminal 50 are connected to each other via a network NW. The network NW is, for example, a local area network (LAN) or the Internet. The connection to the network NW may be either wired or wireless connection. For example, the image forming apparatus 10 is wire-connected to the network NW, and the external terminal 50 is wirelessly connected to the network NW.

With the image forming system 1, various types of operations can be performed on the image forming apparatus 10, using the external terminal 50. In other words, the external terminal 50 is capable of remotely controlling the image forming apparatus 10. The image forming system 1 is also referred to as a "remote control system" that remotely controls the image forming apparatus 10.

1-2. Configuration of Image Forming Apparatus

Figure 2:
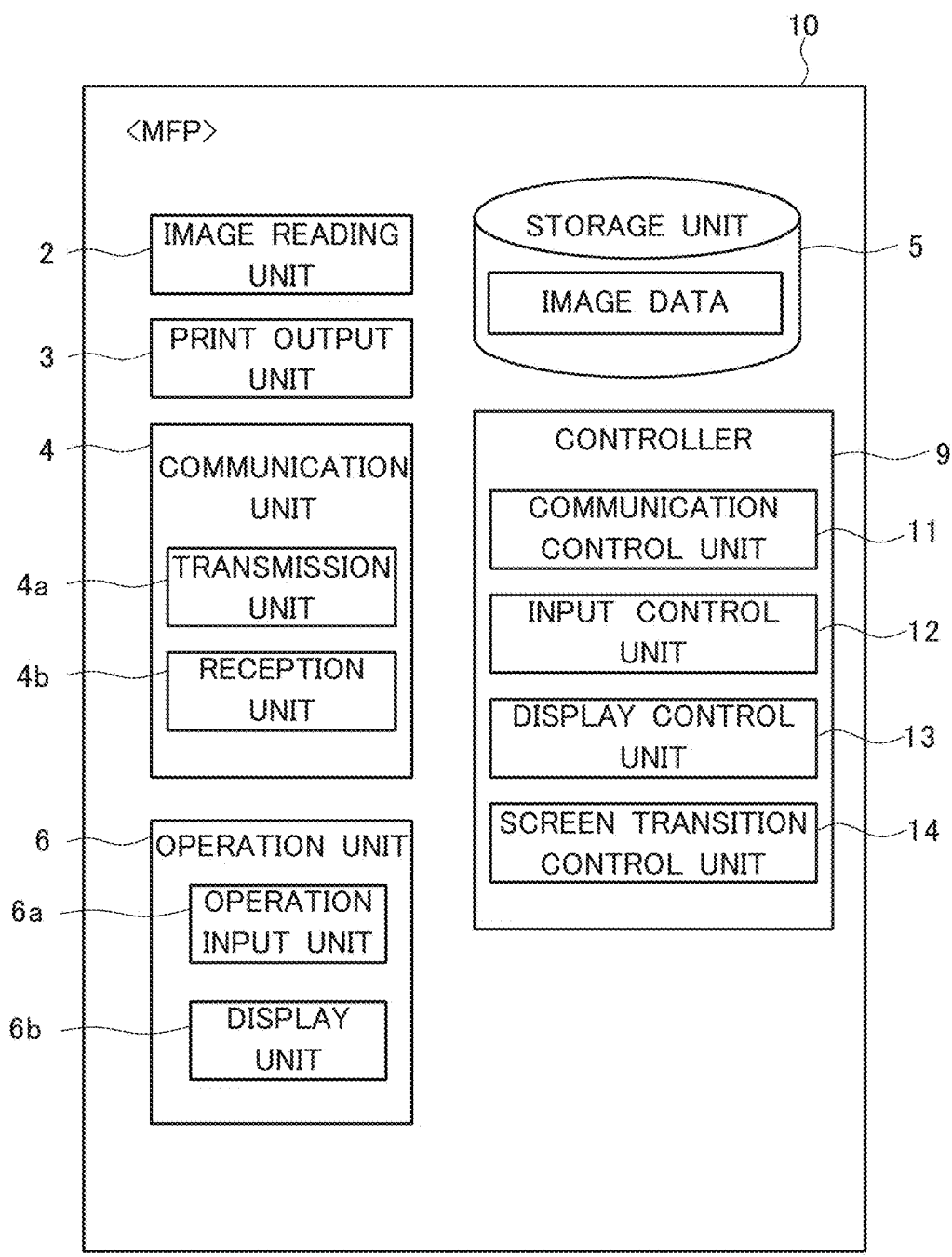
FIG. 2 is a functional block diagram of an image forming apparatus.

FIG. 2 is a functional block diagram of the image forming apparatus 10. Here, a Multi-Functional Peripheral (MFP) is illustrated as an example of the image forming apparatus 10. FIG. 2 illustrates functional blocks of the MFP 10.

The MFP 10 is an apparatus (also, "Multi-Functional Peripheral") having functions such as a scan function, a copy function, a facsimile function, and a box storage function. Specifically, the MFP 10 includes, for example, an image reading unit 2, a print output unit 3, a communication unit 4, a storage unit 5, an operation unit 6, and a controller 9 as illustrated in the functional block diagram of FIG. 2 and realizes various types of functions by operating these units in combination.

The image reading unit 2 is a processing unit configured to optically read (i.e., scan) an original document that is placed at a predetermined position on the MFP 10 and generate image data for this document (also referred to as an "original image" or a "scanned image"). The image reading unit 2 is also referred to as a "scanning unit".

The print output unit 3 is an output unit configured to print out an image on various types of media such as paper on the basis of data regarding an object to be printed.

The communication unit 4 is a processing unit capable of facsimile communication via a public network or the like. The communication unit 4 is also capable of network communication via the network NW. In the network communication, various types of protocols such as TCP/IP (Transmission Control Protocol/Internet Protocol) are used. Using the network communication enables the MFP 10 to exchange various types of data with a desired destination (e.g., external terminal 50). The communication unit 4 includes a transmission unit 4a configured to transmit various types of data and a reception unit 4b configured to receive various types of data.

The storage unit 5 is constituted by a storage device such as a hard disk drive (HDD). The storage unit 5 stores image data of each operation screen, and the like.

The operation unit 6 includes an operation input unit 6a configured to receive input of operation to the MFP 10, and a display unit 6b configured to display and output various types of information.

The MFP 10 is also provided with a generally plate-like operation panel unit 6c (see FIG. 1). The operation panel unit 6c includes a touch panel 25 (see FIG. 1) on the front side. The touch panel 25 functions as part of the operation input unit 6a and also functions as part of the display unit 6b. The touch panel 25 is configured by embedding various sensors and the like in a liquid crystal display panel, and is capable of displaying various types of information and receiving various types of input of operations from an operator.

The touch panel 25 displays, for example, a menu image (including button images, etc.). An operator can set various operation details of the image forming apparatus 10 by pressing a button (the button represented by a button image) that is virtually arranged in the touch panel 25.

As will be described later, a touch panel 75 (see FIG. 1) provided in the external terminal 50 displays a screen similar to the operation screen displayed on the touch panel 25 of the image forming apparatus 10. Using the operation screen displayed on the touch panel 75 of the external terminal 50 realizes an operation similar to the operation performed on the operation screen displayed on the touch panel 25 of the image forming apparatus 10.

The controller 9 is a control device that is built into the MFP 10 and performs overall control of the MFP 10. The controller 9 is configured as a computer system including, for example, a CPU and various types of semiconductor memories (RAM and ROM). The controller 9 realizes various types of processing units by the CPU executing a predetermined software program (hereinafter also referred to simply as a "program") PG1 stored in the ROM (e.g., EEPROM). Note that the program (specifically, a group of program modules) PG1 may be installed into the MFP 10 via a portable recording medium (or in other words, a non-transitory computer-readable recording medium) such as a USB memory or via the network NW or the like.

Specifically, as illustrated in FIG. 2, the controller 9 realizes various types of processing units including a communication control unit 11, an input control unit 12, a display control unit 13, and a screen transition control unit 14 by execution of the program PG1.

Figure 5:
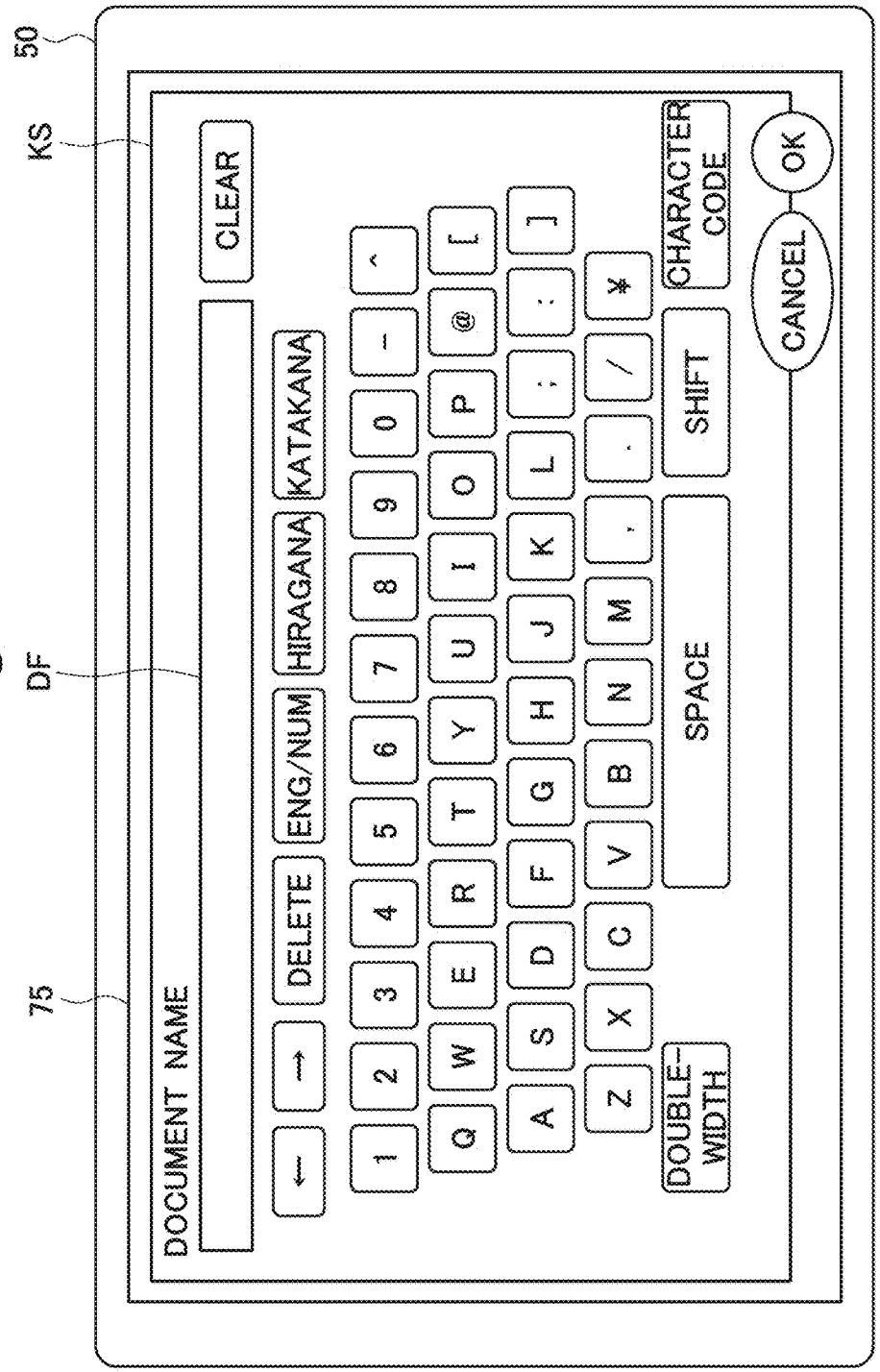
FIG. 5 illustrates a keyboard screen.

The communication control unit 11 is a processing unit configured to control an operation of communication with another device (e.g., the external terminal 50). For example, the communication control unit 11 transmits, to the external terminal 50, an image (specifically, data of the image) to be displayed on a remote control screen (also referred to simply as an "operation screen") MS (see FIG. 5) of the external terminal 50, in cooperation with the communication unit 4 or the like.

The input control unit 12 is a control unit configured to control input operations for operating the operation input unit 6a (e.g., the touch panel 25). For example, the input control unit 12 controls operations for receiving input of operation to the operation screen MS (SP).

The display control unit 13 is a processing unit configured to control a display operation performed by the display unit 6b (e.g., the touch panel 25). The display control unit 13 causes the operation screen MS (SP) or the like for operating the image forming apparatus 10 to be displayed on the touch panel 25.

The screen transition control unit 14 is a control unit configured to control screen transition of the operation screen. The screen transition control unit 14 controls not only screen transition of the operation screen of the touch panel 25, but also screen transition of the operation screen of the touch panel 75. For example, the screen transition control unit 14 determines the content of input of operation to the external terminal 50 on the basis of operational position information (coordinate values representing a position at which the input of operation was made, etc.) transmitted from the external terminal 50, and determines a transition destination screen or the like on the basis of the content of the input of operation.

1-3. Configuration of External Terminal

Next is a description of a configuration of the external terminal (also referred to as the "remote control apparatus") 50.

The external terminal 50 is a portable information input/output terminal device capable of network communication with other devices. Here, a tablet terminal is illustrated as an example of the external terminal 50. The present invention is, however, not limited to this, and the external terminal 50 may, for example, be a smartphone or a personal computer. Also, the external terminal 50 may be either a portable or a stationary apparatus.

Figure 3:
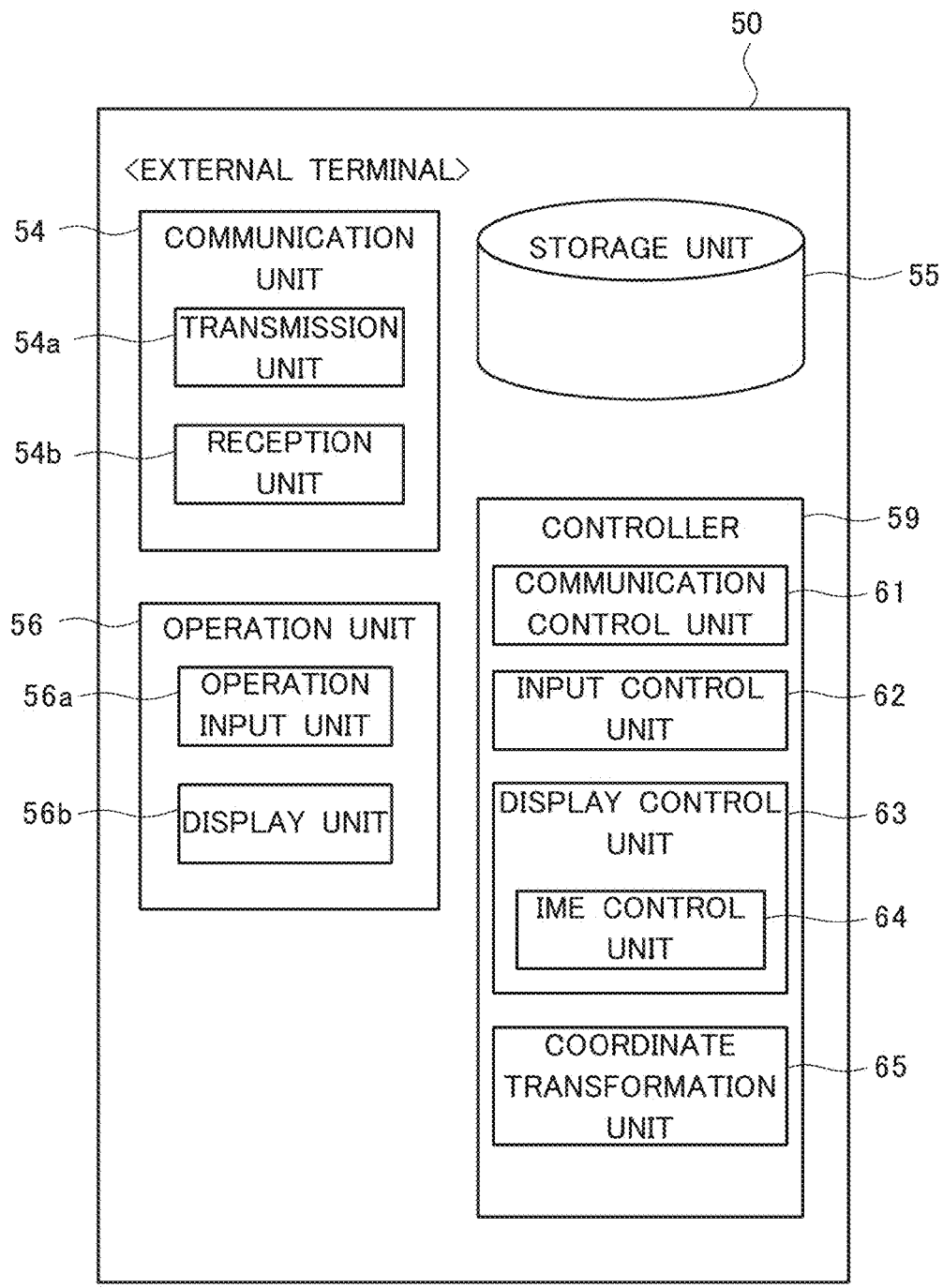
FIG. 3 is a functional block diagram illustrating an overall configuration of an external terminal (remote control apparatus).

FIG. 3 is a functional block diagram illustrating an overall configuration of the external terminal 50.

As illustrated in the functional block diagram of FIG. 3, the external terminal 50 includes, for example, a communication unit 54, a storage unit 55, an operation unit 56, and a controller 59 and realizes various types of functions by operating these units in combination.

The communication unit 54 is capable of network communication via the network NW. In the network communication, various types of protocols such as TCP/IP (Transmission Control Protocol/Internet Protocol) are used, for example. Using the network communication enables the external terminal 50 to exchange various types of data with a desired destination (e.g., the image forming apparatus 10). The communication unit 54 includes a transmission unit 54a configured to transmit various types of data and a reception unit 54b configured to receive various types of data. For example, the reception unit 54b receives a display image (specifically, data of the image) of an operation screen (operation screen for remote control) MS from the MFP 10, and the transmission unit 54a transmits information regarding input of operation to the operation screen MS displayed on the touch panel 75 (information regarding touched coordinates, etc.) to the MFP 10.

The storage unit 55 is configured by a storage device such as a nonvolatile semiconductor memory. Various types of image data transmitted from the MFP 10 are temporarily stored in the storage unit 55. For example, image data of the display image of the operation screen MS is temporarily stored.

The operation unit 56 includes an operation input unit 56a configured to receive input of operation to the external terminal 50, and a display unit 56b configured to display and output various types of information. The external terminal 50 is also provided with the touch panel 75 (see FIG. 1) configured by embedding various sensors and the like in a liquid crystal display panel. Specifically, as illustrated in FIG. 1, the touch panel 75 is provided so as to cover almost the entire surface excluding the periphery (frame portion) on the front side of the generally plate-like external terminal 50. The touch panel 75 functions as part of the operation input unit 56a and also functions as part of the display unit 56b.

An operation screen similar to the operation screen of the touch panel 25 is displayed on the touch panel 75 as the remote control screen MS (the screen for remotely controlling the MFP 10). Also, the touch panel 75 receives a touch gesture operation (also referred to as a "touch operation") made on the remote control screen MS or the like.

The controller 59 shown in FIG. 3 is a control device that is built into the external terminal 50 and performs overall control of the external terminal 50. The controller 59 is configured as a computer system that includes, for example, a CPU and various types of semiconductor memories (RAM and ROM). The controller 59 realizes various types of processing units by the CPU executing a predetermined software program (simply "program") stored in the storage unit (e.g., semiconductor memory). The program may be installed into the external terminal 50 via a portable recording medium (or in other words, a non-transitory computer-readable recording medium) such as a USB memory or via the network NW or the like.

As one of application software programs, an Input Method Editor (IME) (hereinafter also referred to as a "handwriting input IME") for handwriting input for characters is installed in the external terminal 50. The handwriting input IME receives input of operation of a character handwritten by the operating user, and performs processing such as recognizing the character input by handwriting.

A remote control program PG2 is also installed in the external terminal 50. The program PG2 is an application software program for remotely controlling the image forming apparatus 10 and realizes various functions regarding remote control.

Specifically, the controller 59 realizes various types of processing units including a communication control unit 61, an input control unit 62, a display control unit 63, an IME control unit 64, and a coordinate transformation unit 65 by execution of the program PG2.

The communication control unit 61 is a processing unit configured to control an operation of communication with, for example, the image forming apparatus 10 in cooperation with the communication unit 54 or the like. For example, the communication control unit 61 receives a display image of the operation screen MS or KS (see FIGS. 4 and 5) of the external terminal 50 in cooperation with the communication unit 54 or the like.

The input control unit 62 is a control unit configured to control input operations for operating the operation input unit 56a (the touch panel 75, etc.). For example, the input control unit 62 controls an operation for receiving input of touch operation to the operation screen MS or KS, and the like.

The coordinate transformation unit 65 is a processing unit configured to convert coordinate values representing a position at which input of operation was made in the touch panel 75 from the values in the coordinate system of the touch panel 75 of the external terminal 50 to values in the coordinate system of the touch panel 25 of the image forming apparatus 10. The coordinate values obtained by the conversion are transmitted to the image forming apparatus 10 by the communication control unit 61 or the like as position information (operational position information) MP indicating the position at which the input of operation was made.

The display control unit 63 is a processing unit configured to control a display operation performed by the display unit 56b (e.g., the touch panel 75). The display control unit 63 causes the operation screen MS (SE) or the like for remotely controlling the image forming apparatus 10 to be displayed on the touch panel 75.

The display control unit 63 includes the IME control unit 64. The IME control unit 64 is configured to control an operation of the handwriting input IME installed in the external terminal 50. The IME control unit 64 controls whether or not to display a handwriting input screen HS on the touch panel 75. Specifically, the IME control unit 64 controls, for example, an operation of displaying the handwriting input screen HS together with the keyboard screen KS, which will be described later.

1-4. Operation Screen

With the image forming system 1, an operation screen MS (also referred to as "SP") (not shown) is displayed on the touch panel 25 of the image forming apparatus 10, and an operation screen MS (also referred to as "SE") (see FIG. 4) is displayed on the touch panel 75 of the external terminal 50. The operation screen SE displayed on the touch panel 75 is, in appearance, similar to the operation screen SP displayed on the touch panel 25.

The operation screen MS (SE) of the external terminal 50 is displayed basically on the basis of image data (also referred to as "simulated image data") of an image obtained by simulating the operation screen MS (SP) of the touch panel 25 of the image forming apparatus 10. The simulated image data is configured as, for example, a bitmapped image.

Here, an electronic mail transmission screen (also referred to as an "email transmission screen") (FIG. 4) is illustrated as an example of the operation screen MS.

Figure 4:
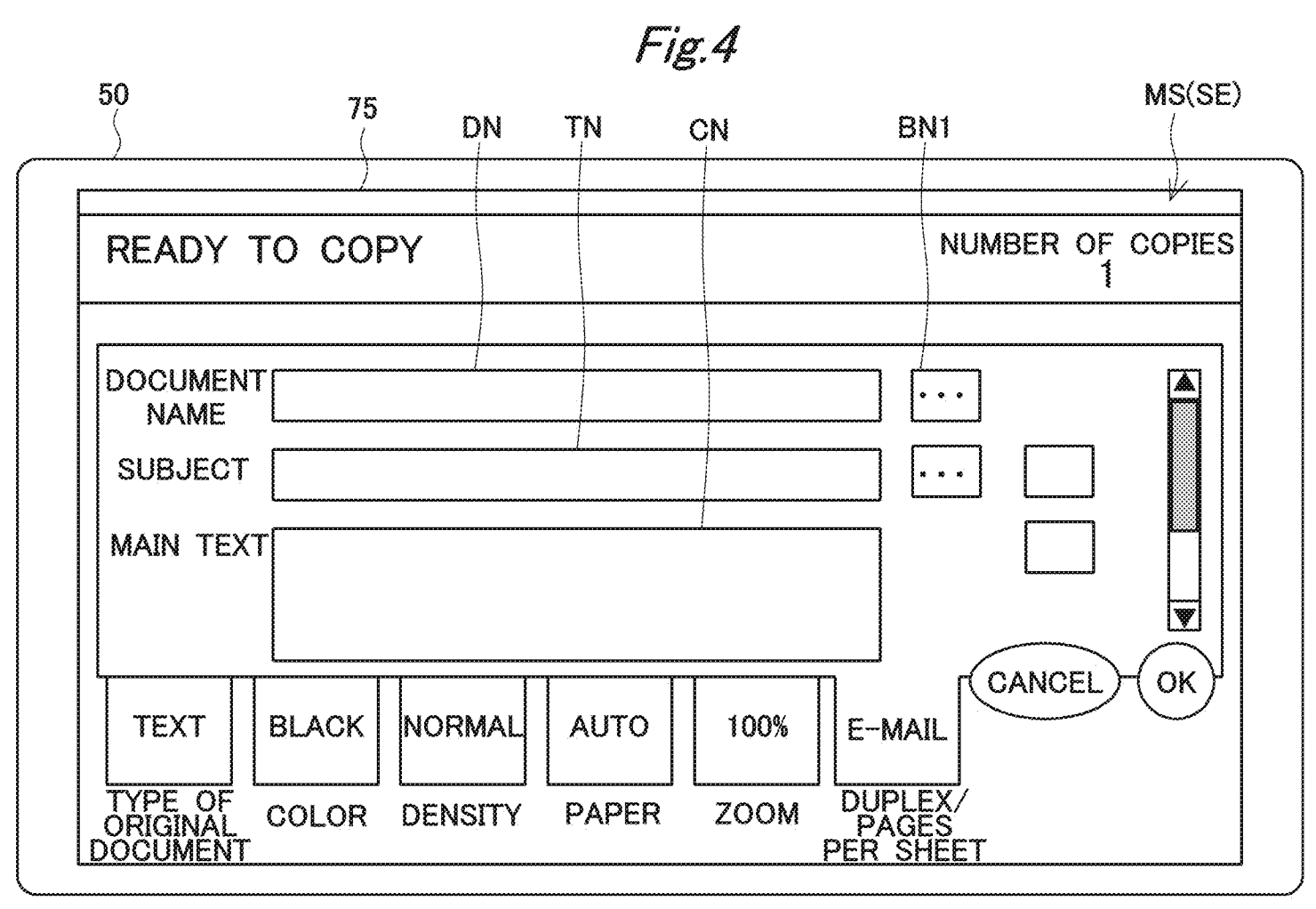

FIG. 4 illustrates an email transmission screen MS. The email transmission screen MS includes a document name field DN, a subject field TN, a main text field CN, and the like.

An operation of inputting characters in the document name field DN, the subject field TN, or the main text field CN is performed in the following manner.

First, when the document name field DN itself (or a keyboard invoking button BN1 provided on the right side of the document name field DN) is pressed, a software keyboard screen KS (see FIG. 5) is displayed.

The software keyboard screen (also referred to as a "keyboard screen") KS includes a plurality of character buttons (character keys) corresponding to respective characters. The operating user can perform a character input operation, using these character buttons.

In this embodiment, however, when image data of the keyboard screen KS is received by the external terminal 50, the keyboard screen KS is displayed on the basis of the image data, and the handwriting input IME is activated immediately after the keyboard screen KS has been displayed.

Figure 6:
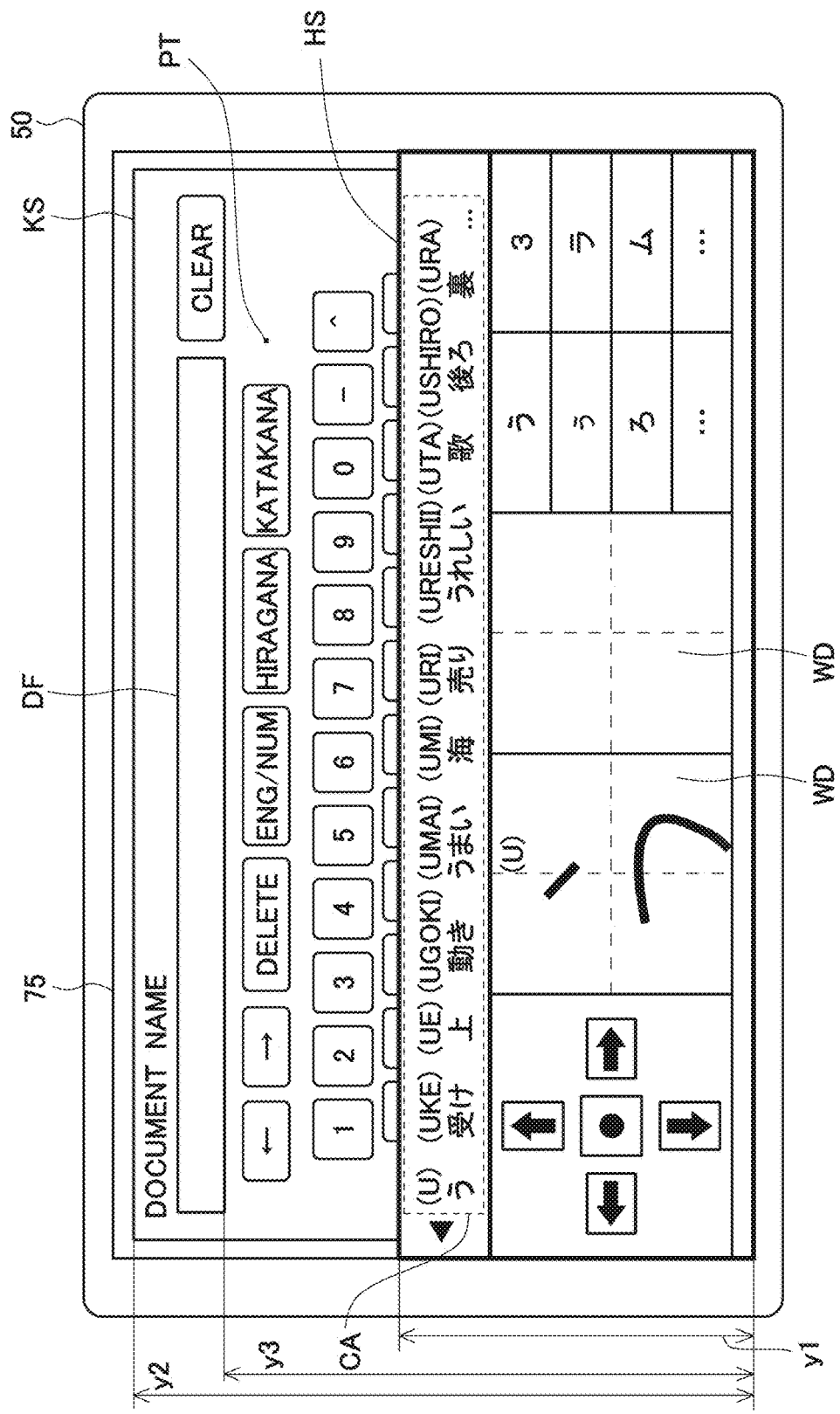
FIG. 6 illustrates a state in which a handwriting input screen is superimposed on the keyboard screen.

Specifically, an input screen (also referred to as a "handwriting input screen") HS (see FIG. 6) of the handwriting input IME is displayed on the keyboard screen KS in a superimposed manner after a predetermined delay period Δt (e.g., 100 ms (milliseconds)) has passed from when the keyboard screen KS was displayed (display start time). In other words, immediately after the keyboard screen KS has been displayed, the handwriting input screen HS is displayed on the keyboard screen KS with a slight delay period Δt. To be more specific, immediately after the keyboard screen KS has been displayed, the handwriting input screen HS is displayed on the touch panel 75 in such an animated manner that the handwriting input screen HS gradually moves upward from the lower end of the keyboard screen KS. The handwriting input screen HS is finally displayed as illustrated in FIG. 6.

At this time, a height y1 of the handwriting input screen HS is determined so as to be less than a height y2 of the keyboard screen KS (e.g., the height y1 is approximately 50% to 80% of the height y2) so that the handwriting input screen HS is displayed only in a portion (lower portion in this example) of the keyboard screen KS. This creates a portion that is not covered by the handwriting input screen HS (a portion in the keyboard screen on which the handwriting input screen is not superimposed (non-superimposed portion)) in the keyboard screen KS.

The input character display field DF in the keyboard screen KS is also used in a character input operation (described next) performed on the handwriting input screen HS. Thus, the handwriting input screen HS is displayed so as to not cover the input character display field DF (in other words, so as to not overlap the input character display field DF). Specifically, the height y1 of the handwriting input screen HS is determined so as to be smaller than a height y3 from the lower end of the handwriting input screen HS to the lower end of the input character display field DF.

In this way, the keyboard screen KS and the handwriting input screen HS are displayed in combination. In this state, the keyboard screen KS is disabled, and the handwriting input screen HS is enabled.

Then, in this display state, characters are input with the use of the handwriting input screen HS. That is, the user can perform input of operation to the operation screen of the image forming apparatus 10 by using the handwriting input IME pre-installed in the external terminal 50.

Specifically, when a line representing a character (e.g., hiragana letter "U") is drawn in a handwriting input area WD of the handwriting input screen HS by a finger of the operator, the handwriting input IME performs character recognition processing on the basis of the trajectory of finger movement or the like, and displays conversion candidates (input candidates) based on the result of the character recognition processing in a conversion candidate field CA. If the operator selects a desired option (e.g., a Japanese Kanji character called "UE") from the conversion candidate field CA, the selected character string is displayed in the input character display field DF of the keyboard screen KS. The selected character string is not only displayed in the input character display field DF, but also notified to the image forming apparatus 10. The image forming apparatus 10 thereby acquires the content of the input of operation using the handwriting input IME, and recognizes the same content as that displayed in the input character display field DF of the external terminal 50 as operator's input content.

The operator can also select to input an operation using the original keyboard screen KS, instead of the handwriting input IME. Specifically, when the operator has pressed (or in other words, designated) a portion that is not covered by the handwriting input screen HS in the keyboard screen KS of the touch panel 75 (a portion in the keyboard screen KS where the handwriting input screen HS is not superimposed) (e.g., position PT), the keyboard screen KS is enabled in turn. More specifically, in response to the position PT being pressed, the external terminal 50 disables and hides the handwriting input screen HS and displays only the original keyboard screen KS on the touch panel 75 (see FIG. 5). Then, a normal character input operation using the keyboard screen KS is received.

With this configuration, the handwriting input screen HS is displayed on the touch panel 75 when the image data of the keyboard screen KS is received, and thus the operator of the external terminal 50 can perform a relatively easy character input operation (remote operation) using the handwriting input screen HS. In other words, the external terminal 50 allows easy use of a character input method (specifically, the character input method using the handwriting input screen HS through the handwriting input IME) that is different from the character input method using the keyboard screen KS. In other words, it is possible to offer versatility in the character input method for inputting characters to the remote control apparatus.

Also, the touch panel 75 displays not only the handwriting input screen HS, but also a combination of the keyboard screen KS and the handwriting input screen HS. To be more specific, the keyboard screen KS and the handwriting input screen HS are displayed such that the handwriting input screen HS is superimposed primarily on the lower portion of the keyboard screen KS, making the keyboard screen KS partially covered by and partially exposed behind the handwriting input screen HS. This indicates not only the presence of the handwriting input screen HS, but also the presence of the keyboard screen KS. Accordingly, the operator can easily recognize that a character input operation using the keyboard screen KS is also possible.

When the operator thereafter has pressed a portion (e.g., position PT) that is not covered by the handwriting input screen HS in the keyboard screen KS of the touch panel 75, in turn the handwriting input screen HS is disabled (hidden) and the keyboard screen KS is enabled. After such a state transition (transition to a state in which the keyboard screen KS is enabled), the operator can actually perform a character input operation using the keyboard screen KS.

Figure 11:
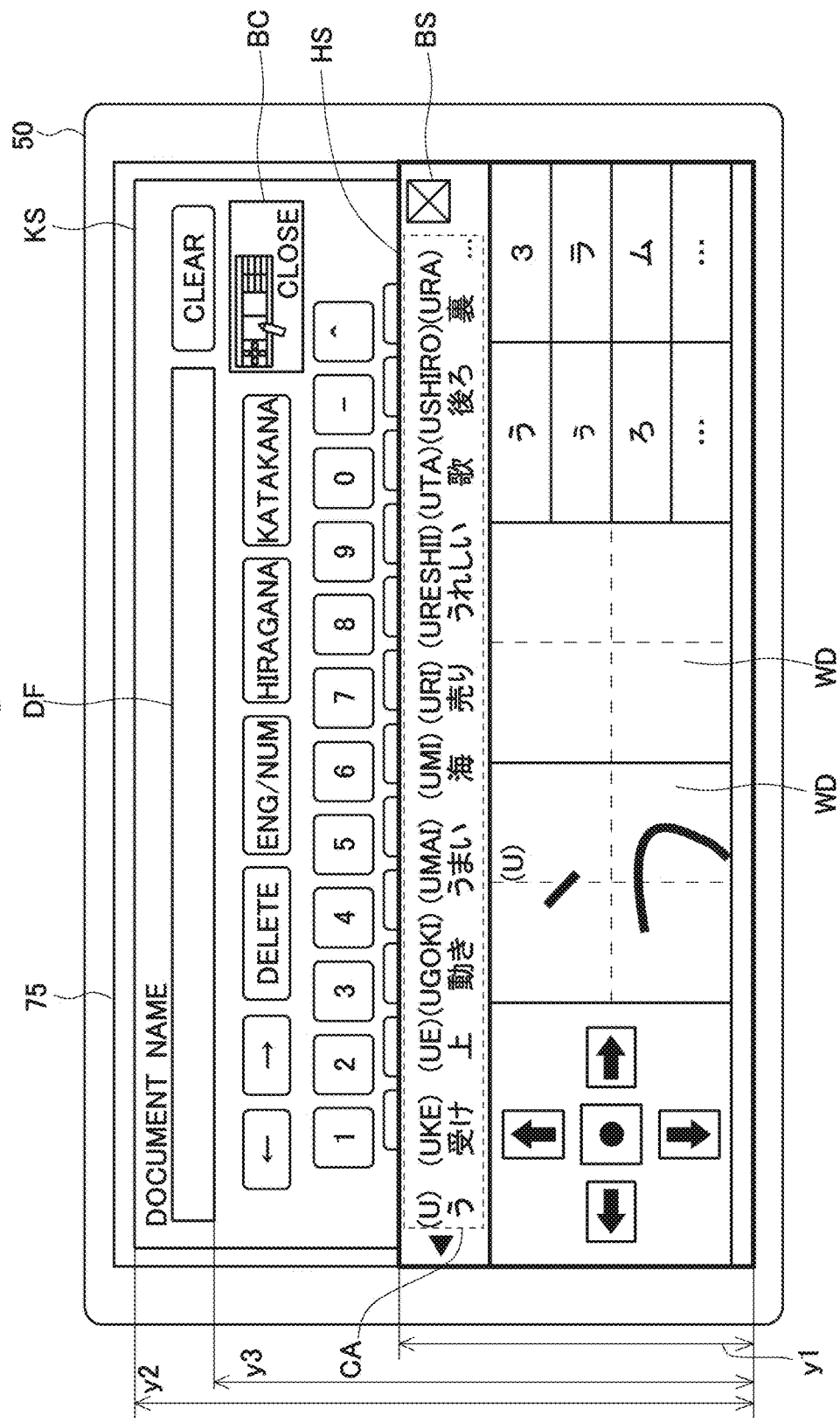
FIG. 11 illustrates a display screen according to a variation.

Here, an example is mainly illustrated in which the handwriting input screen HS is disabled (hidden) and the keyboard screen KS is enabled in response to an operation of pressing the position PT (a command operation to switch the operation screen, hereinafter, "switch command operation"), but the present invention is not limited thereto. For example, a configuration is possible in which the handwriting input screen HS is disabled (hidden) and the keyboard screen KS is enabled in response to other operations (switch command operations). Examples of the other switch command operations include an operation of pressing a "Close" button BS (see FIG. 11) provided in the handwriting input screen HS and an operation of pressing a handwriting input disabling button BC (see FIG. 11) provided in the keyboard screen KS (in the non-superimposed portion thereof). Specifically, the screen shown in FIG. 11 may be displayed in place of the screen shown in FIG. 6, and the button BC (or the button BS) shown in FIG. 11 may be used in the switch command operation.

1-5. Operations

Figure 7:
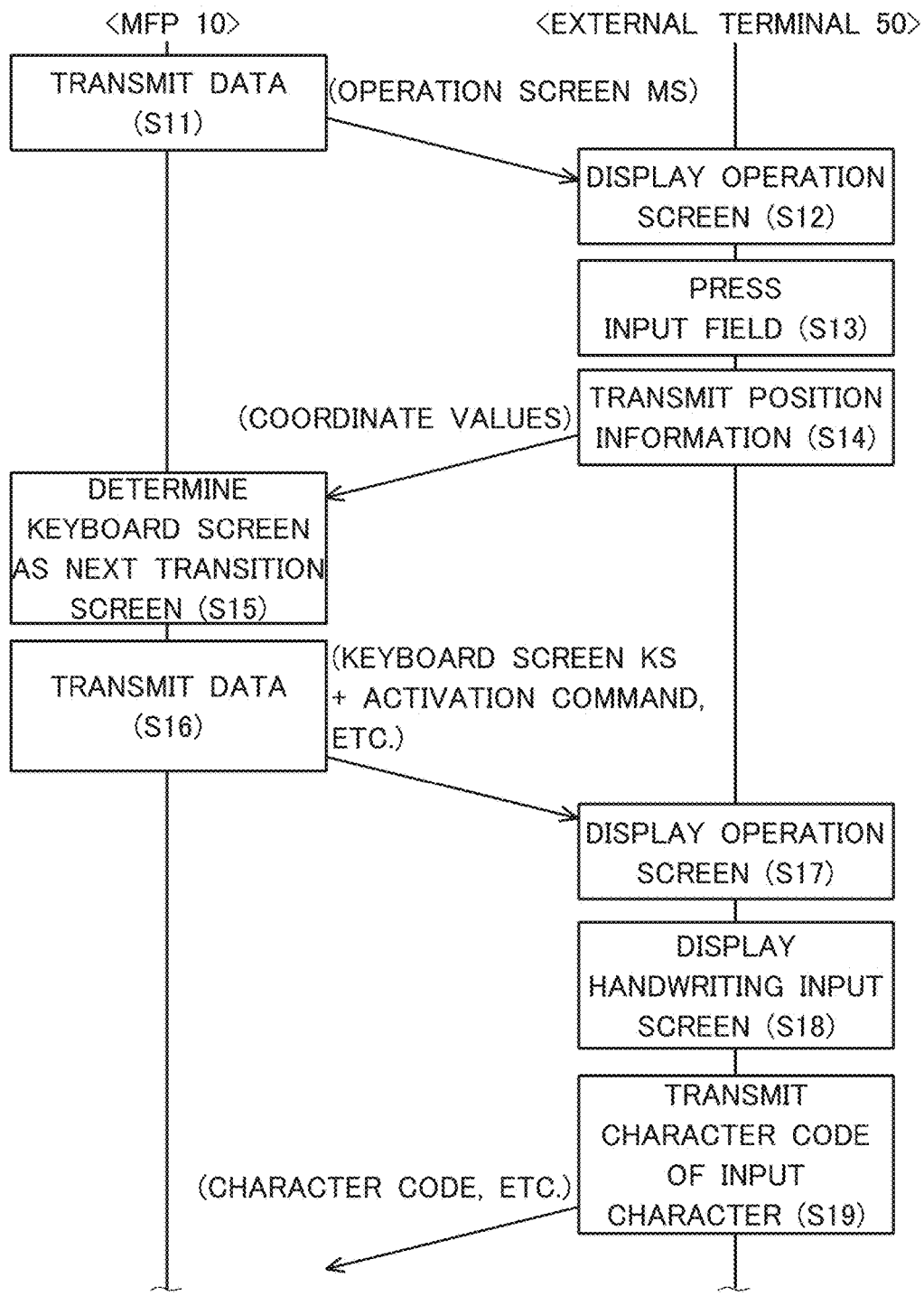
FIG. 7 illustrates operations performed by the image forming apparatus and the external terminal.

Next is a description of operations performed in the image forming system 1 with reference to FIG. 7. FIG. 7 illustrates operations performed by the image forming apparatus 10 and the external terminal 50.

First, in response to an operation by the operator, the image forming apparatus 10 (the transmission unit 4a) transmits image data of the operation screen MS (FIG. 4) (also referred to as "operation screen data") to the external terminal 50 (step S11).

The external terminal 50 (the display control unit 63) displays the operation screen MS on the touch panel 75 on the basis of the received operation screen data (step S12).

Thereafter, when the operator has pressed the document name field DN in the operation screen MS displayed on the touch panel 75 (step S13), the external terminal 50 (e.g., the communication control unit 11) transmits position information MP regarding a position input by the operation of the operator (specifically, coordinate position information regarding the pressed position, etc.) to the image forming apparatus 10 (step S14).

Upon receiving the position information MP, the image forming apparatus 10 (the reception unit 4b and the screen transition control unit 14) determines, on the basis of the position information MP, that the position pressed by the operator is a position within the document name field DN, and that the input of operation from the operator is a command to display a software keyboard, and determines to display the keyboard screen KS as the next transition screen (step S15).

In response to the determination, the image forming apparatus 10 (the screen transition control unit 14) transmits image data regarding the keyboard screen KS and activation command data for activating handwriting input IME, to the external terminal 50 (step S16). The data regarding the keyboard screen KS includes image data for displaying the keyboard screen KS as a new operation screen, and data regarding the input character display field DF in the keyboard screen KS (information (initial values) regarding the position and size of the input character display field DF, and characters within the input character display field DF, etc.). The activation command data includes data (activation command data) indicating an activation command (itself) to activate the handwriting input IME installed in the external terminal 50, and data indicating the aforementioned delay period Δt.

After that, the external terminal 50 (the display control unit 63) displays the keyboard screen KS (see FIG. 5) on the basis of the received image data (step S17). The external terminal 50 further activates the handwriting input IME in response to start of display of the keyboard screen KS (step S18). To be more specific, the input screen HS of the handwriting input IME is displayed on the touch panel 75 immediately after the start of display of the keyboard screen KS and after elapse of the delay period Δt. Specifically, the external terminal 50 (the display control unit 63 and the IME control unit 64) activates the handwriting input IME with appropriate timing on the basis of the data indicating the activation command to activate the handwriting input IME and the data indicating the delay period Δt described above, and displays the input screen HS (see FIG. 6) of the handwriting input IME after the delay period Δt has passed from the time of the start of display of the keyboard screen KS, such that the input screen HS is superimposed on part of the keyboard screen KS (step S18).

As described above, when a line representing a character (e.g., hiragana letter "U") is drawn in the handwriting input area WD of the handwriting input screen HS by a finger of the operator, the handwriting input IME performs character recognition processing on the basis of the trajectory of finger movement, and displays conversion candidates (input candidates) based on the result of the character recognition processing in the conversion candidate field CA (FIG. 6). When the operator selects a desired option (e.g., a Japanese Kanji character "UE") from the conversion candidate field CA, the selected character string is displayed in the input character display field DF of the keyboard screen KS. The selected character string (specifically, the character code of each character) is also transmitted to the image forming apparatus 10 (step S19). By receiving information regarding the character string, the image forming apparatus 10 also acquires the content of the operation input using the handwriting input IME and recognizes the same content as that displayed in the input character display field DF of the external terminal 50 as operator's input content. It is preferable that a group of character codes in the character string is transmitted to the image forming apparatus 10, together with, for example, the positions of the respective characters constituting the character string in the input character display field DF.

When the operator has pressed a portion (e.g., position PT) that is not covered by the handwriting input screen HS in the keyboard screen KS of the touch panel 75, the handwriting input screen HS is disabled (hidden) and the keyboard screen KS is enabled. After the transition to this state, the operator can actually perform a character input operation using the keyboard screen KS.

Figure 8:
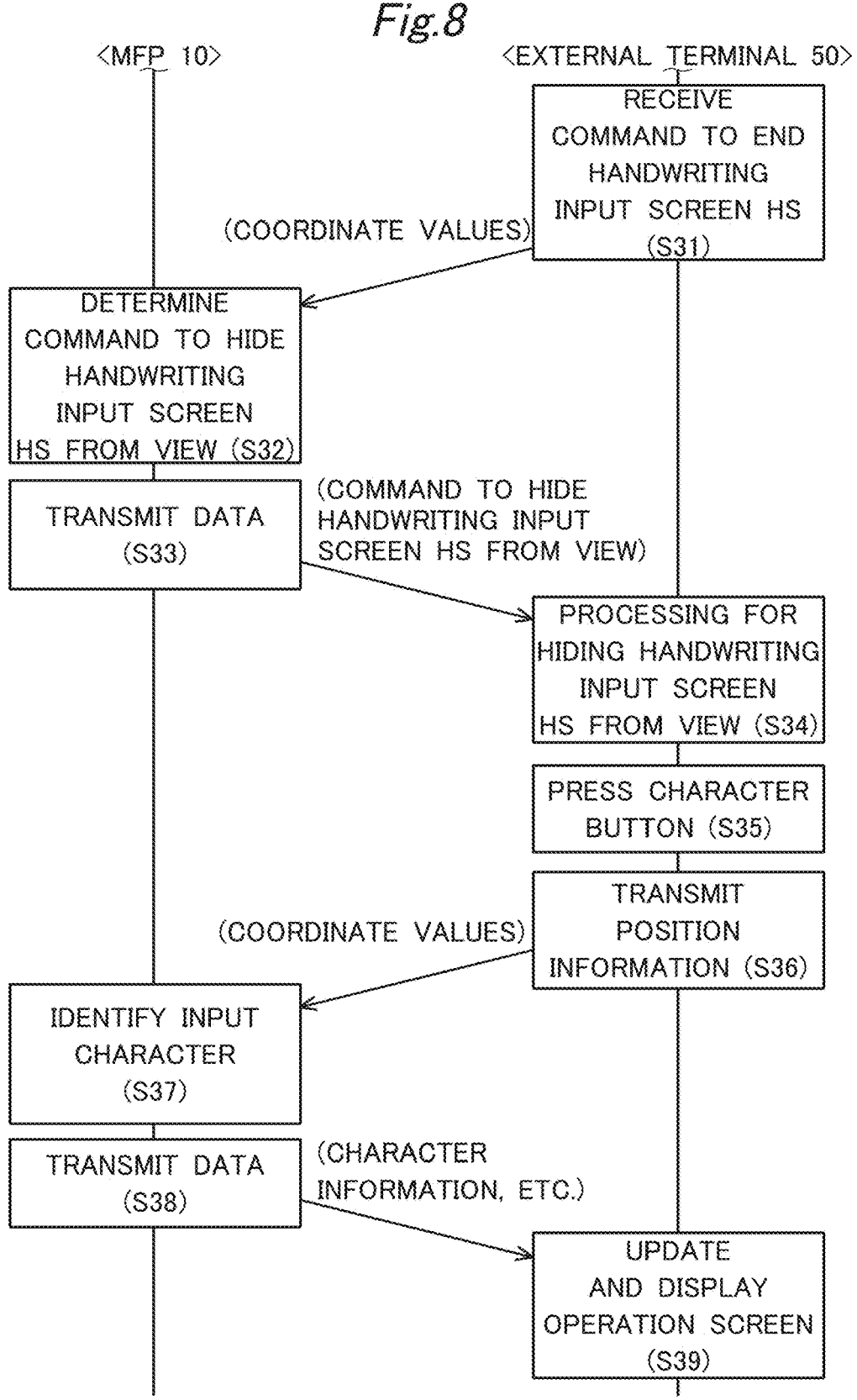
FIG. 8 illustrates operations performed by the image forming apparatus and the external terminal.

Specifically, as illustrated in the flowchart of FIG. 8, when a command to end the handwriting input screen HS is given to the external terminal 50 by the operator pressing the position PT (step S31), the external terminal 50 (e.g., the communication control unit 11) transmits position information MP regarding operation input by the user (specifically, coordinate position information regarding the position PT, etc.) to the image forming apparatus 10.

Upon receiving the position information MP (coordinate values) regarding the pressed position PT, the image forming apparatus 10 (the reception unit 4b and the screen transition control unit 14) determines that a command to disable the handwriting input screen HS (a command to hide the handwriting input screen HS) has been given to the external terminal 50 from the operator (step S32). The image forming apparatus 10 (the transmission unit 4a and the screen transition control unit 14) also notifies (transmits) the command to disable the handwriting input screen HS (the command to hide the handwriting input screen HS) to the external terminal 50 (step S33). Note that the command to disable the handwriting input screen HS (the command to hide the handwriting input screen HS from view) also serves as a command to enable the keyboard screen KS (a command to display the keyboard screen KS).

In response to the receipt of the command to disable the handwriting input screen HS (the command to hide the handwriting input screen HS), the external terminal 50 (the display control unit 63) hides the handwriting input screen HS and displays only the keyboard screen KS on the touch panel 75 (see FIG. 5) so as to enable the keyboard screen KS and disable the handwriting input screen HS (step S34).

In this display state, the operator can perform a character input operation using the keyboard screen KS.

Specifically, upon receipt of and in response to the operator's operation of pressing each character button (step S35), the external terminal 50 (e.g., the communication control unit 11) transmits position information MP regarding operation input by the user (specifically, coordinate position information regarding the pressed position, etc.) to the image forming apparatus 10 (step S36). Upon receiving the position information MP regarding the pressed position, the image forming apparatus 10 (the reception unit 4b and the screen transition control unit 14) determines, on the basis of the position information MP, that a character (e.g., "A") corresponding to the position information MP (coordinate values) has been input (step S37). Then, the image forming apparatus 10 (the transmission unit 4a and the screen transition control unit 14) notifies (transmits) information indicating that the character "A" needs to be added to the input character display field DF, to the external terminal 50 (step S38). In response to the notification, the external terminal 50 (the display control unit 63) additionally displays that character (in a superimposed manner) in the input character display field DF of the keyboard screen KS (step S39). In this way, the operator can actually perform a character input operation using the keyboard screen KS.

Note that in this case, information indicating that the character "A" input by the operation needs to be added is notified from the image forming apparatus 10 to the external terminal 50, and the character "A" is displayed on the keyboard screen KS of the external terminal 50 in an superimposed manner, but the present invention is not limited thereto. For example, a configuration is possible in which image data of an updated image of the keyboard screen KS in which the character "A" input by the operation has been added is transmitted from the image forming apparatus 10 to the external terminal 50, and the updated image is displayed on the external terminal 50 on the basis of the image data for the updated image.

While the above first embodiment illustrates a configuration in which the handwriting input screen HS is displayed with a slight delay period immediately after the keyboard screen KS has been displayed, the present invention is not limited thereto. For example, the handwriting input screen HS may be displayed in part of the keyboard screen KS in a superimposed manner at the same time when the keyboard screen KS is displayed. To be more specific, the above delay period Δt may be set to 0 milliseconds (ms) so as to cause the handwriting input screen HS and the keyboard screen KS to be displayed simultaneously. Alternatively, a combined image produced in advance by superimposing the entire handwriting input screen HS on the keyboard screen KS may be displayed (instantaneously).

While the above first embodiment describes a case in which the data (activation command data) indicating a command to activate the handwriting input IME is transmitted from the image forming apparatus 10 to the external terminal 50 together with the image data indicating the keyboard screen KS (step S16, etc.), and the external terminal 50 activates the handwriting input IME on the basis of the activation command data (step S18, etc.), the present invention is not limited thereto.

For example, a configuration is possible in which the external terminal 50 receives an image ID to be displayed from the image forming apparatus 10 and determines whether or not to activate the handwriting input IME on the basis of a list LT of image IDs for which the handwriting input IME is to be activated. To be more specific, the external terminal 50 previously stores, in its storage unit 55, information regarding the list LT of one or a plurality of image IDs for which the handwriting input IME is to be activated. Then, upon receiving an image identifier (image ID) of a keyboard screen KS that is an image to be displayed from the image forming apparatus 10 together with the image data of the keyboard screen KS, the external terminal 50 determines whether or not the image ID (the image ID of the keyboard screen KS) received from image forming apparatus 10 is included in the plurality of image IDs in the list LT. The external terminal 50 activates the handwriting input IME in the same manner as described above if the image ID (e.g., the image ID indicating the keyboard screen KS) received from the image forming apparatus 10 is included in the plurality of image IDs in the list LT (see FIG.

6). In this way, the external terminal 50 may determine whether or not to activate the handwriting input IME.

2. Second Embodiment

The above first embodiment illustrates a configuration in which in response to receipt of image data of the keyboard screen KS, the handwriting input screen HS is displayed automatically at the same time when the keyboard screen KS is displayed, but the present invention is not limited thereto. For example, a configuration is possible in which when the image data of the keyboard screen KS is received, the handwriting input screen HS is displayed in response to a further operation performed by the operator.

Figure 9:
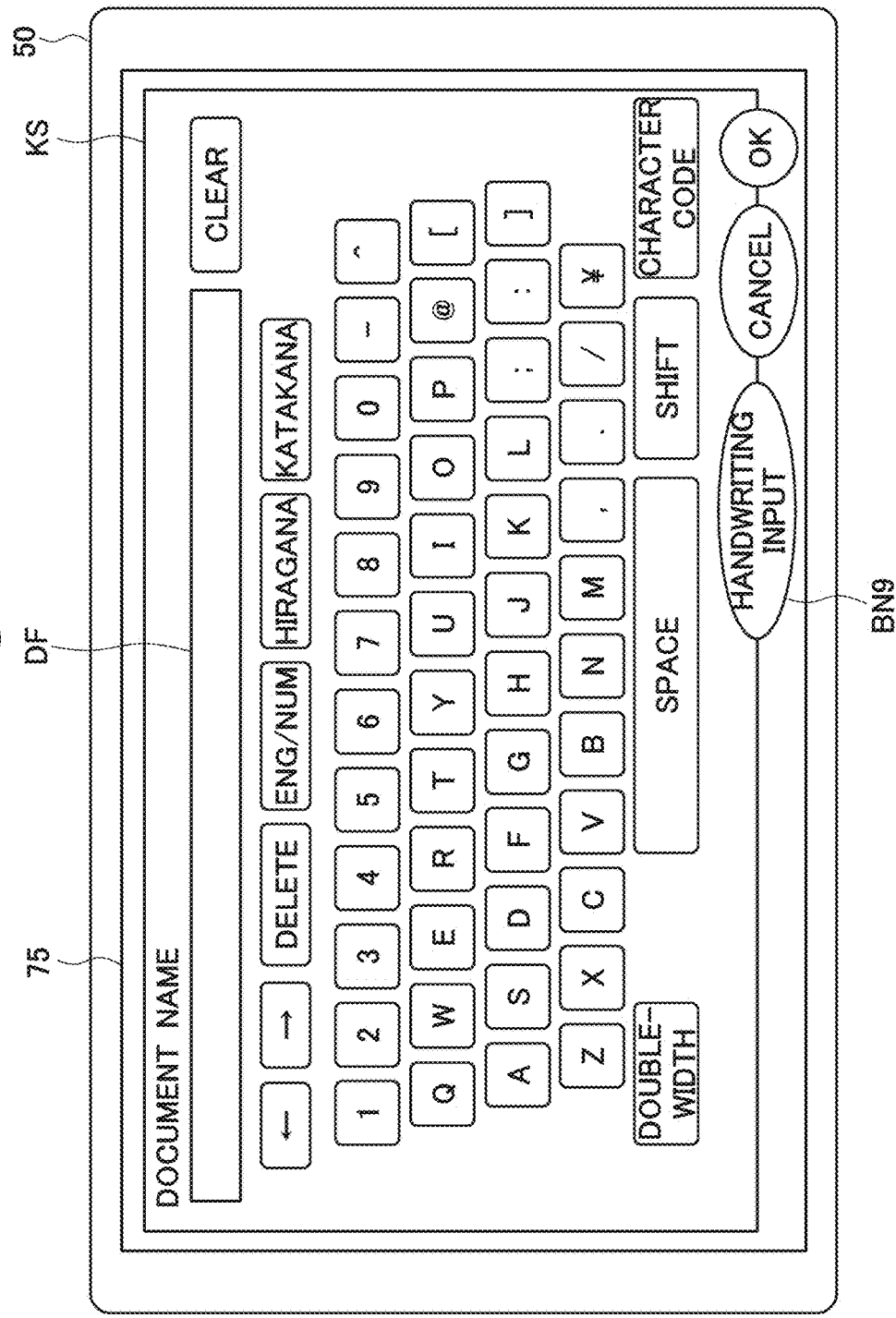
FIG. 9 illustrates a keyboard screen according to a second embodiment of the present invention.

Specifically, in response to receipt of image data of the keyboard screen KS, the external terminal 50 temporarily displays only the keyboard screen KS on the touch panel 75 (without displaying the handwriting input screen HS). Then, if a predetermined button (e.g., a "handwriting input" button BN9 (see FIG. 9)) provided in the keyboard screen KS is pressed by the operator, the handwriting input screen HS (see FIG. 6) is displayed on the touch panel 75 so that a character input operation can be performed using the handwriting input screen HS. Such a configuration will be described in the second embodiment.

Figure 10:
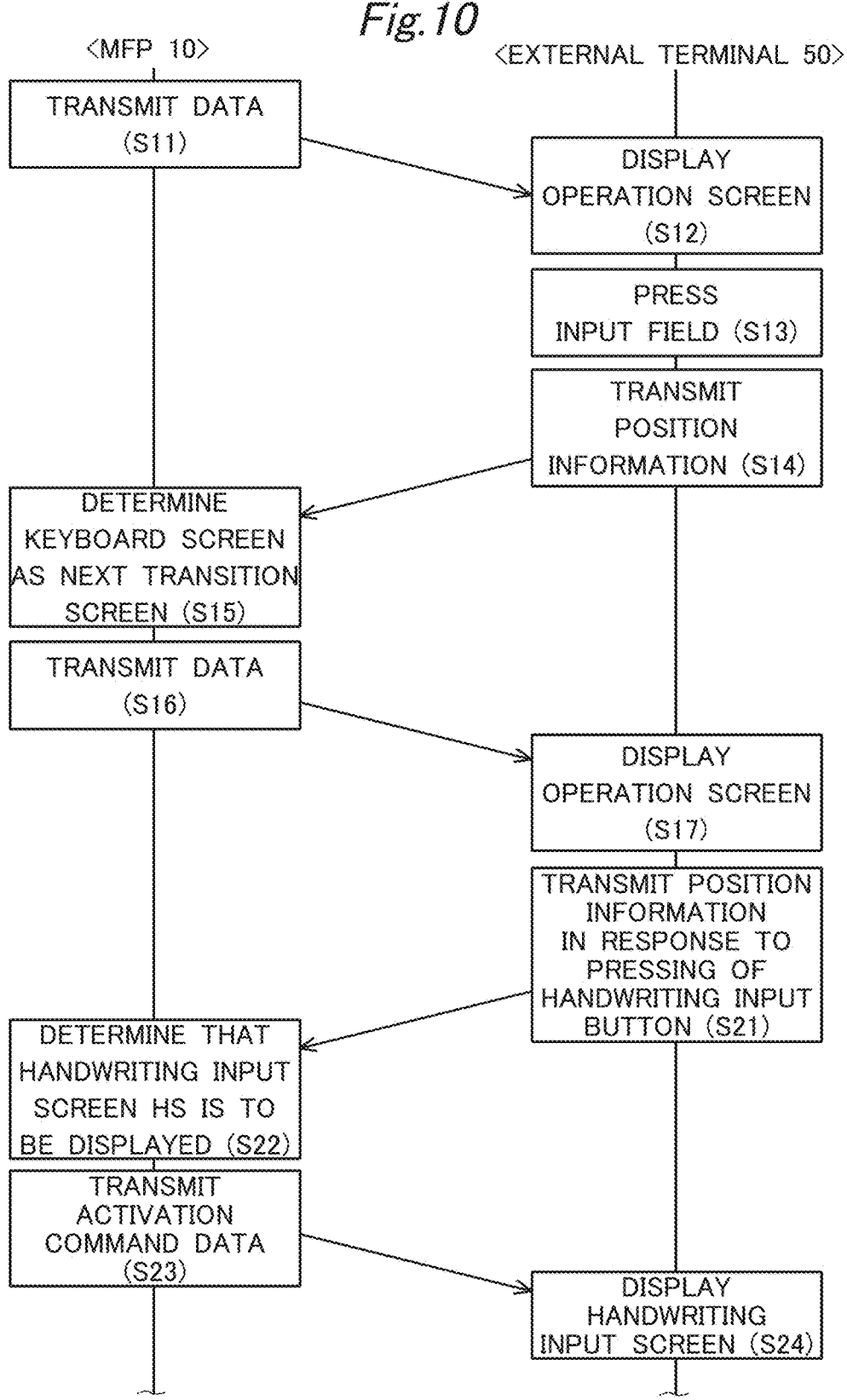
FIG. 10 illustrates operations according to the second embodiment.

FIG. 10 illustrates operations according to the second embodiment.

Steps S11 to S17 are performed in the same manner as in the first embodiment. In the second embodiment, however, step S21 is performed after step S17, instead of step S18. Also, a keyboard screen KS according to the second embodiment includes a "handwriting input" button BN9 (see FIG. 9). The operator can select a character input operation using the handwriting input IME by pressing (or in other words, designating) the "handwriting input" button BN9.

When an operation of pressing the "handwriting input" button BN9 is received in a state where the keyboard screen KS (FIG. 9) is displayed (step S17), the external terminal 50 (e.g., the communication control unit 11) transmits position information MP regarding the pressed position and the like to the image forming apparatus 10 (step S21).

Upon receiving the position information MP, the image forming apparatus 10 (the reception unit 4b and the screen transition control unit 14) determines, on the basis of the position information MP, that the input of operation from the operator is an operation of pressing the "handwriting input" button BN9 and determines to display the handwriting input screen HS on the touch panel 75 (step S22).

Specifically, in step S23, the image forming apparatus 10 (the screen transition control unit 14) transmits activation command data for activating the handwriting input IME to the external terminal 50.

Upon receiving the activation command data, the external terminal 50 performs processing of step S24. Specifically, the external terminal 50 (the display control unit 63 and the IME control unit 64) activates the handwriting input IME on the basis of the data regarding the command to activate the handwriting input IME, and displays the input screen HS for the handwriting input IME (see FIG. 6) on the keyboard screen KS in a superimposed manner (step S24).

In this way, the handwriting input screen HS (see FIG. 6) is displayed on the touch panel 75 after the "handwriting input" button BN9 (see FIG. 9) has been pressed.

Thereafter, the same operations as in the first embodiment are performed.

The second embodiment illustrates a configuration in which in response to the handwriting input button BN9 being pressed, position information regarding the pressed position is transmitted to the image forming apparatus 10, and the handwriting input IME is activated on the basis of an activation command generated on the image forming apparatus 10 side on the basis of the position information. However, the present invention is not limited thereto. For example, the handwriting input screen HS may be displayed only on the external terminal 50 side in response to the handwriting input button BN9 being pressed.

Specifically, when an operation of pressing the "handwriting input" button BN is detected in a state where the keyboard screen KS (FIG. 9) is displayed (step S17), the external terminal 50 (e.g., the communication control unit 11) may determine that a command to activate the handwriting input screen HS has been received by the pressing and may immediately activate the handwriting input IME and display the handwriting input screen HS. In this case, the external terminal 50 receives in advance information regarding the "handwriting input" button BN9 (information regarding the position and size of the button) from the image forming apparatus 10 (steps S16 and S17). Then, the external terminal 50 may activate the handwriting input IME and display the handwriting input screen HS, on the condition that it is determined that a command to activate the handwriting input screen HS has been given on the basis of the information regarding the "handwriting input" button BN9 and the position information regarding the position at which the pressing operation was performed.

3. Variations

While the above has been a description of embodiments of the present invention, the present invention is not intended to be limited to the details described above.

For example, the above embodiments describe a case in which the handwriting input screen HS is displayed on the lower side of the keyboard screen KS in a superimposed manner, but the present invention is not limited thereto. The handwriting input screen HS may be superimposed on the right or left side of the keyboard screen KS. In this case, it is also preferable that the handwriting input screen HS is displayed so as to not cover the input character display field DF (to not overlap the input character display field DF).

Figure 12:
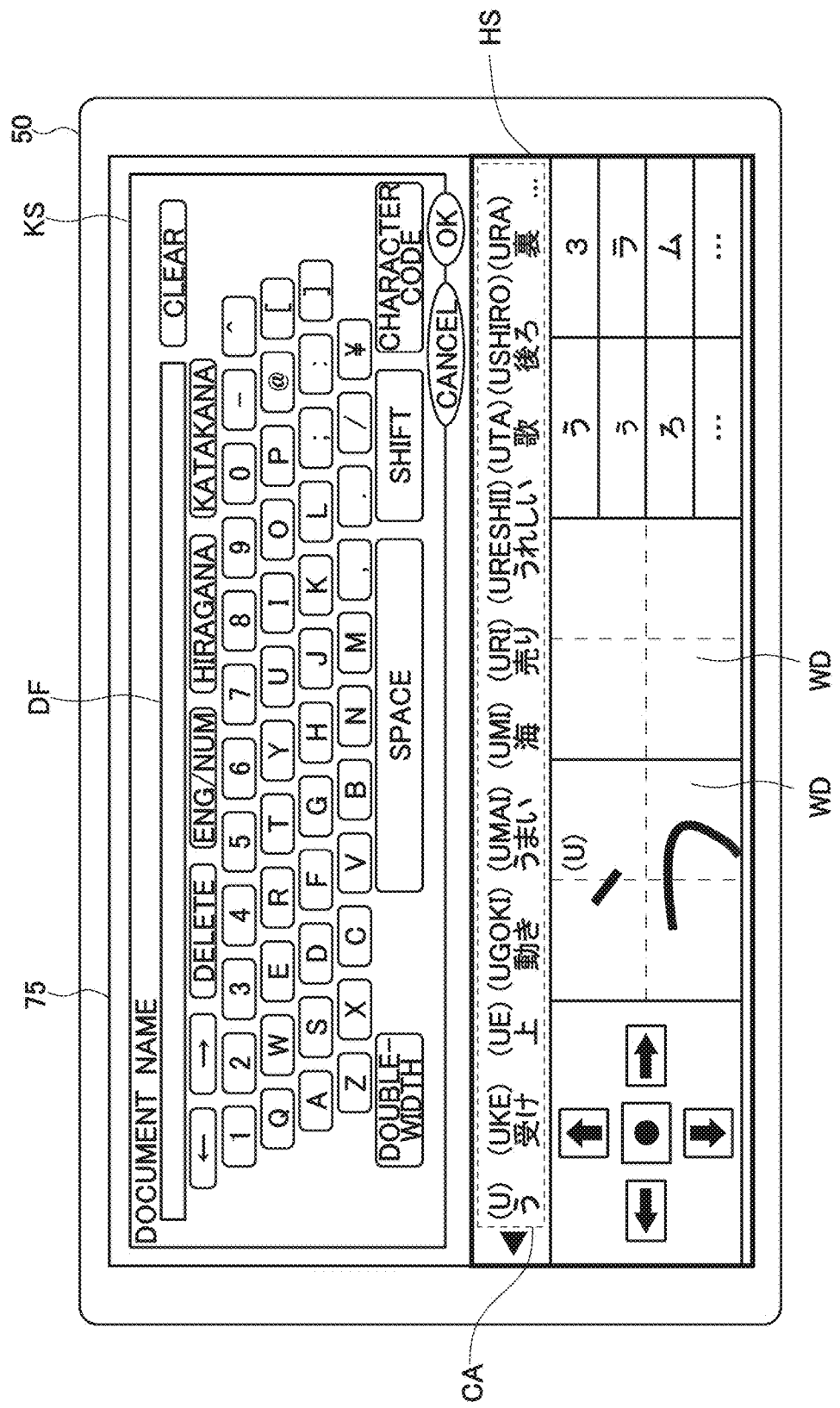
FIG. 12 illustrates a display screen according to another variation.

While the above embodiments describe a case in which the handwriting input screen HS is displayed such that the handwriting input screen HS is superimposed on part of the keyboard screen KS (superimposed arrangement), the present invention is not limited thereto. The handwriting input screen HS may be displayed on the touch panel 75 together with the keyboard screen KS such that the handwriting input screen HS is arranged in parallel with the keyboard screen KS (parallel arrangement). For example, as illustrated in FIG. 12, the keyboard screen KS that is reduced in size in the vertical direction and the handwriting input screen HS may be arranged in parallel in the vertical direction. Image data regarding the keyboard screen KS that is reduced in size in the vertical direction may be generated in advance on the image forming apparatus 10 side and transmitted from the image forming apparatus 10 to the external terminal 50.

The above embodiments illustrate a case in which the screen is transitioned from the handwriting input screen HS back to the keyboard screen KS (steps S31 and S32). The screen may be thereafter transitioned from the keyboard screen KS back to the handwriting input screen HS. To be more specific, in step S17, the keyboard screen KS (see FIG. 9) including the "handwriting input" button BN9 may be displayed instead of the keyboard screen KS shown in FIG.

5, and the handwriting input screen HS may be again displayed and enabled in response to a pressing operation of the "handwriting input" button BN9. This allows the keyboard screen KS and the handwriting input screen HS to be easily switched. In other words, more flexible screen transition between the keyboard screen KS and the handwriting input screen HS is possible.

The above first embodiment illustrates a configuration in which the handwriting input screen HS is automatically displayed, and the above second embodiment illustrates a configuration in which the handwriting input screen HS is displayed in response to pressing of a button by the operator. However, whether the handwriting input screen HS is displayed automatically or manually may be determined selectively according to the content of settings made in the image forming apparatus 10. Specifically, the image forming apparatus 10 may be provided with a setting screen for switching between the two screens, so that automatic and manual display of the handwriting input screen HS can be switched appropriately according to the content of settings made through the setting screen.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. A remote control apparatus for remotely controlling an image forming apparatus, comprising:
    a display configured to display a first operation screen based on image data received from the image forming apparatus for remotely controlling the image forming apparatus; and
    a hardware processor configured to:
        activate a handwriting input application that is installed in the remote control apparatus, in response to receiving image data of a software keyboard screen as a second operation screen from the image forming apparatus, wherein information can be input into the remote control apparatus via the software keyboard screen; and
        display a handwriting input screen on the display, the handwriting input screen being an input screen for the activated handwriting input application, wherein the same information can be input into the handwriting input screen.

2. The remote control apparatus according to claim 1, wherein the hardware processor is configured to display the handwriting input screen for the handwriting input application on the display, together with the software keyboard screen based on the image data.

3. The remote control apparatus according to claim 2, wherein the hardware processor is configured to display the handwriting input screen such that the handwriting input screen is superimposed on part of the software keyboard screen.

4. The remote control apparatus according to claim 3, wherein the hardware processor is configured to enable the software keyboard screen in response to designation of a portion on which the handwriting input screen is not superimposed in the software keyboard screen.

5. The remote control apparatus according to claim 2, wherein the hardware processor is configured to display the handwriting input screen in parallel with the software keyboard screen.

6. The remote control apparatus according to claim 2, wherein the hardware processor is configured to activate the handwriting input application in response to start of display of the software keyboard screen.

7. The remote control apparatus according to claim 6, wherein the hardware processor is configured to display the handwriting input screen after a predetermined delay period has passed from the start of display of the software keyboard screen.

8. The remote control apparatus according to claim 6, wherein the hardware processor is configured to display the handwriting input screen at the same time as the start of display of the software keyboard screen.

9. The remote control apparatus according to claim 2, wherein the hardware processor is configured to, in response to receiving the image data, display the software keyboard screen on the display without displaying the handwriting input screen, and thereafter, upon activation of the handwriting input application after designation of a predetermined button provided in the software keyboard screen, display the handwriting input screen and the software keyboard screen on the display.

10. The remote control apparatus according to claim 2, wherein the hardware processor is configured to display the handwriting input screen such that the handwriting input screen does not overlap an input character display field in the software keyboard screen.

11. A non-transitory computer-readable recording medium having recorded thereon a program for causing a computer built into a remote control apparatus for remotely controlling an image forming apparatus to execute the steps of:
    a) receiving image data for displaying a software keyboard screen on the remote control apparatus from the image forming apparatus;
    b) activating a handwriting input application that is installed in the remote control apparatus in response to receiving the image data of the software keyboard screen from the image forming apparatus, wherein information can be input into the remote control apparatus via the software keyboard screen; and
    c) displaying a handwriting input screen on a display provided in the remote control apparatus, the handwriting input screen being an input screen for the handwriting input application activated in the step b), wherein the same information can be input into the handwriting input screen.

12. The non-transitory computer-readable recording medium according to claim 11, wherein in the step c), the handwriting input screen is displayed, together with the software keyboard screen based on the image data, on the display of the remote control apparatus.

13. The non-transitory computer-readable recording medium according to claim 12, wherein in the step b), the handwriting input application is activated in response to start of display of the software keyboard screen.

14. The non-transitory computer-readable recording medium according to claim 13, wherein in the step c), the handwriting input screen is displayed after a predetermined delay period has passed from the start of display of the software keyboard screen.

15. The non-transitory computer-readable recording medium according to claim 12, wherein in the step c), the handwriting input screen is displayed such that the handwriting input screen is superimposed on part of the software keyboard screen.

16. The non-transitory computer-readable recording medium according to claim 12, wherein in the step c), the handwriting input screen is displayed such that the handwriting input screen does not overlap an input character display field in the software keyboard screen.

17. The non-transitory computer-readable recording medium according to claim 15, wherein the program causes the computer to further execute the step of:
   d) enabling the software keyboard screen in response to designation of a portion of the keyboard screen on which the handwriting input screen is not superimposed.

18. The non-transitory computer-readable recording medium according to claim 12, wherein the program causes the computer to further execute the steps of:
   e) upon receiving the image data of the software keyboard screen from the image forming apparatus in the step a), displaying the software keyboard screen on the display provided in the remote control apparatus on the basis of the image data; and
   f) receiving designation of a predetermined button provided in the software keyboard screen after the software keyboard screen is displayed on the display, and
   in the step b), after the designation of the predetermined button in the step f), the handwriting input application installed in the remote control apparatus is activated.

19. An image forming system comprising:
   an image forming apparatus; and
   the remote control apparatus according to claim 1 for remotely controlling the image forming apparatus,
   the image forming apparatus including a hardware processor configured to:
      receive position information from the remote control apparatus, the position information being information regarding input of operation from an operator to an operation screen displayed on the remote control apparatus; and
      transmit image data of a software keyboard screen to the remote control apparatus when it is determined, on the basis of the position information, that the input of operation is a command to display a software keyboard.

20. The image forming system according to claim 19, wherein the hardware processor of the remote control apparatus is configured to display the handwriting input screen for the handwriting input application, together with the software keyboard screen based on the image data, on the display of the remote control apparatus.

21. An image forming apparatus capable of being remotely controlled by a remote control apparatus, comprising:
   a hardware processor configured to:
      receive position information from the remote control apparatus, the position information being information regarding input of an operation from an operator to an operation screen, the operation screen based on image data received from the image forming apparatus and displayed on the remote control apparatus; and
      transmit image data of a software keyboard screen and activation command data to the remote control apparatus when it is determined, on the basis of the position information, that the input of operation is a command to display a software keyboard, wherein information can be input into the remote control apparatus via the software keyboard screen, the activation command data indicating that a handwriting input application installed in the remote control apparatus is to be activated, wherein the same information can be input into the handwriting input screen.

* * * * *